United States Patent
Bailey, Sr. et al.

(10) Patent No.: US 8,491,671 B2
(45) Date of Patent: Jul. 23, 2013

(54) MIXTURE OF DISPERSING AGENTS

(75) Inventors: Byron Scott Bailey, Sr., Mont Airy, NC (US); Bruce Owen Griffin, Kernersville, NC (US); Brenda W. Lyons, Thomasville, NC (US); Martin Weber, Steinen (DE); Bruno Saretto, Riehen (CH); Heinrich Schlingmann, Wehr (DE); Georges Mahler, Sierentz (FR)

(73) Assignee: Huntsman International LLC, The Woodlands, TX (US)

( * ) Notice: Subject to any disclaimer, the term of this patent is extended or adjusted under 35 U.S.C. 154(b) by 1139 days.

(21) Appl. No.: 10/582,307

(22) PCT Filed: Dec. 1, 2004

(86) PCT No.: PCT/EP2004/053190
§ 371 (c)(1),
(2), (4) Date: Mar. 30, 2007

(87) PCT Pub. No.: WO2005/059239
PCT Pub. Date: Jun. 30, 2005

(65) Prior Publication Data
US 2007/0214582 A1 Sep. 20, 2007

Related U.S. Application Data

(60) Provisional application No. 60/529,371, filed on Dec. 11, 2003.

(51) Int. Cl.
*C09B 67/00* (2006.01)
*C09B 67/10* (2006.01)
*D06P 1/00* (2006.01)

(52) U.S. Cl.
USPC .................................................. 8/550; 8/636

(58) Field of Classification Search
USPC .............................................................. 8/636
See application file for complete search history.

(56) References Cited

U.S. PATENT DOCUMENTS 5,009,669 A * 4/1991 Jollenbeck et al. ............... 8/573

FOREIGN PATENT DOCUMENTS

| EP | 0474595 | 3/1992 |
|---|---|---|
| GB | 2187746 | 9/1987 |
| WO | 97/03242 | 1/1997 |

OTHER PUBLICATIONS

Stic/Eic Structure Search, completed by Stic on Apr. 18, 2009.*
English language abstract for Ep 0474595, Mar. 11, 1992.

* cited by examiner

*Primary Examiner* — Harold Pyon
*Assistant Examiner* — Katie L Hammer

(57) ABSTRACT

The present invention relates to a mixture of at least two different dispersing agents, an aqueous dispersion containing a UV absorber selected from benzotriazoles, benzotriazines and benzophenones and a mixture of at least two different dispersing agents and a method for reducing the differential pressure in the static dyeing process.

10 Claims, No Drawings

MIXTURE OF DISPERSING AGENTS

The present invention relates to a mixture of at least two different dispersing agents, an aqueous dispersion containing a UV absorber (UVA) selected from benzotriazoles, benzotriazines and benzophenones and a mixture of at least two different dispersing agents and a method for reducing the differential pressure in the static dyeing process.

Differential pressure in static dyeing is often caused by inclusion of UV absorber preparations, certain dyestuffs, or other components of the dyebath. These preparations, containing benzotriazoles, substituted benzotriazoles, benzotriazines, or benzophenones as the active agents, are used to protect textiles from the damaging effects of ultraviolet light. They are often used in conjunction with disperse dyes. In many cases this dye bath combination creates additional differential pressure when used in static dyeing equipment including, but not limited to, package-dyeing machines, stock dyeing machines, beam dyeing machines and others.

Differential pressure is the difference between the pressure produced by the dyeing machine pump under normal circulation conditions, before addition of the dyes and chemicals, as compared with the pressure generated after adding the dyes and chemicals to the machine. Elevation of the dye bath temperature causes the pressure differential to increase until the exhaustion temperature is reached when the dyes and chemicals are transported into the fiber itself. This increase in pressure causes uneven circulation allowing the dyes and chemicals to deposit unevenly throughout the substrate, resulting in faulty or non-uniform dyeing. The problem becomes more severe as the fineness of the fiber increases, and/or as the density of the substrate to be dyed increases. Certain dyes and chemicals are known to be troublesome for this condition including, but not limited to, disperse dyes, benzotriazole UV absorbers, substituted benzotriazole UV absorbers, benzotriazine UV absorbers, some benzophenone UV absorbers, and certain types of dispersants commonly used for synthetic fibers and dyes or chemicals.

It has now unexpectedly been found that the differential pressure can be substantially reduced or even eliminated when a specific mixture of at least two different dispersants is combined with UV absorbers of the benzotriazole-, benzotriazine- and benzophenone-type.

The invention therefore relates to a composition comprising
(A) 75-95% by weight of a compound of formula (1)

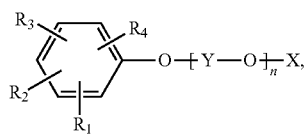

wherein $R_1$, $R_2$, $R_3$ and $R_4$ independently of the other denote hydrogen, $C_1$-$C_{12}$alkyl, $C_5$-$C_{24}$aryl or $C_6$-$C_{36}$aralkyl, Y represents ethylene or propylene, n is a number from 4 to 50 and X denotes hydrogen, $C_1$-$C_{12}$alkyl, the acid radical of an inorganic oxygen containing acid or the radical of an organic acid, and
(B) 5-25% by weight of a formaldehyde condensation product prepared from an aromatic sulfonic acid and formaldehyde,
the total amount of components (A)+(B) being 100% by weight.

Components (A) and (B) as described above are well known in the art of textile dyeing as dispersants and/or surfactants.

$C_1$-$C_{12}$alkyl as radicals $R_1$ to $R_4$ and X includes for example methyl, ethyl, propyl, isopropyl, n-butyl, isobutyl, sec-butyl, tert-butyl, amyl, tert-amyl (1,1-dimethylpropyl) n-pentyl, neopentyl, and n-hexyl.

Examples for $C_5$-$C_{24}$aryl are phenyl, tolyl, mesityl, isityl, xylyl, naphthyl, anthryl and phenanthryl.

$C_6$-$C_{36}$aralkyl as $R_1$ includes for example benzyl, 2-phenylethyl, diphenylmethyl, naphthylmethyl and 2-naphthylethyl.

The acid radical X is derived for example from low molecular weight dicarboxylic acids, for example maleic acid, succinic acid or sulfosuccinic acid and is bonded with an ester bridge to the alkyleneoxy moiety of the molecule. Preferably, however, X is derived from an inorganic polybasic acid such as sulfuric acid and in particular orthophosphoric acid.

The acid radical X can be present as free acid or in salt form, i.e. for example as alkali or alkaline earth metal, ammonium or amine salt. Examples of such salts are lithium, sodium, potassium, magnesium, calcium, barium, ammonium, trimethylamine, diethylamine, ethanolamine, diethanolamine and triethanolamine salts. The mono- and diethanolamine salts can additionally be etherified with 1 to 25 ethyleneoxy units.

The compositions according to the invention preferably contain as component (A) a compound of the formula (1), wherein $R_1$ is $C_4$-$C_{12}$alkyl, phenyl, tolyl, phenyl-$C_1$-$C_3$alkyl or tolyl-$C_1$-$C_3$alkyl, $R_2$ and $R_3$ are, independently from the other, hydrogen, $C_4$-$C_{12}$alkyl, phenyl, tolyl, phenyl-$C_1$-$C_3$alkyl or tolyl-$C_1$-$C_3$alkyl, $R_4$ is hydrogen, X is an acid radical derived from sulfuric acid or orthophosphoric acid, Y represents ethylene and n is a number from 4 to 40.

Particularly preferred as component (A) are compounds of the formula (1), wherein $R_1$ is 1-phenylethyl, $R_2$ and $R_3$ are, independently from the other, hydrogen or 1-phenylethyl, $R_4$ is hydrogen, Y represents ethylene and n is a number from 12 to 30.

Very particular preference is given to the ethanolamine, diethanolamine, triethanolamine, ammonium, potassium or sodium salts of a mixture of monoester and diester phosphate of the polyadduct of 12 to 18 mol of ethylene oxide with the adduct of 1 to 3 mol of styrene with 1 mol of phenol.

Compounds of the formula (1) are described, for example, in U.S. Pat. No. 5,009,669.

Suitable components (B) are also mentioned in U.S. Pat. No. 5,009,669.

Preferred components (B) are condensation products of formaldehyde with sulfonated naphthalene, $C_1$-$C_4$alkylnaphthalene, biphenyl, diphenyl ether, ditolyl ether, phenol, toluene, xylene or mesitylene.

Particular preference is given to a condensation product of formaldehyde with sulfonated ditolyl ether and a condensation product of formaldehyde with sulfonated di-(2-naphthyl) methane.

In a further preferred embodiment the compositions according to the invention additionally contain
(C) 0.1 to 10% by weight of a polyadduct of 2 to 80 mol of alkylene oxide with unsaturated or saturated monoalcohols, fatty acids, fatty amines or fatty amides of 8 to 22 carbon atoms;
the total amount of components (A)+(B)+(C) being 100% by weight.

Component (C) is preferably) a polyadduct of 3 to 30 mol of ethylene oxide or propylene oxide with 1 mol of a fatty alcohol of 12 to 24 carbon atoms.

Especially preferred as component (C) is a polyadduct of 20 to 30 mol of ethylene oxide with 1 mol of stearyl alcohol.

The relative amounts of components (A), (B) and (C) may vary within wide ranges. Preferably the compositions according to the invention contain 76-84% by weight, in particular 77-82% by weight, of component (A), 14-22% by weight, in particular 16-21% by weight, of component (B) and 2-6%, in particular 3-5% by weight, by weight of component (C).

As mentioned above, the dispersant mixtures according to the invention can advantageously be combined with benzotriazole-, benzotriazine- or benzophenone UV absorbers which often cause differential pressure in the static dyeing process.

Accordingly, a further object of the present invention is an aqueous dispersion containing 5-40% by weight, based on the total composition, of a UV absorber selected from benzotriazoles, benzotriazines and benzophenones and 5-30% by weight, based on the total composition, of a dispersant composition as described above.

Preferably, the aqueous dispersion according to the invention contains as UV absorber a benzotriazole compound of the formula (2)

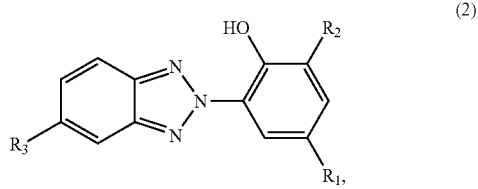

(2)

wherein $R_1$ is halogen, $C_1$-$C_{12}$alkyl or $C_1$-$C_{12}$alkoxy and $R_2$ and $R_3$ are each independently of the other hydrogen, halogen, $C_1$-$C_{12}$alkyl or $C_1$-$C_{12}$alkoxy.

Suitable compounds of the formula (2) are described, for example, in U.S. Pat. No. 5,009,669.

The compound of formula (2a) is especially preferred

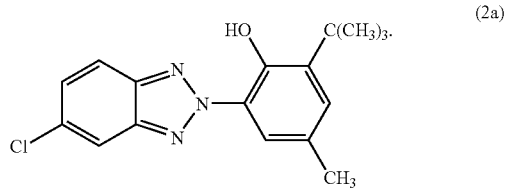 [SMILES: Cc1cc(-n2nc3ccc(Cl)cc3n2)c(O)c(C(C)(C)C)c1]

(2a)

Aside from the UV absorber and the dispersant mixture, the aqueous dispersion according to the invention advantageously contains in addition 1-10% by weight, based on the total composition, of a stabilizing or thickening agent.

Such an addition serves to adjust the viscosity of dispersion.

Suitable stabilizing or thickening agents are in particular carboxyl-containing polymers. These are used in the form of 0.5 to 10% aqueous solutions or dispersions, based on the solution or dispersion.

These polymers are advantageously polymerized ethylenically unsaturated mono- or dicarboxylic acids of 3 to 5 carbon atoms, for example polyacrylic acid or polymers of methacrylic acid crotonic acid, itaconic acid, teraconic acid, maleic acid, fumaric acid, citraconic acid or mesaconic acid, copolymers of olefins, for example ethylene or propylene, diketenes, acrylic esters, methacrylic esters or acrylamides and the aforementioned monomers, including acrylic acid or copolymers of acrylic acid with methacrylic acid, methacrylonitrile or vinyl monomers, for example vinylphosphonic acid, copolymers of maleic acid and styrene, maleic acid and a vinyl ester, for example vinyl acetate.

The thickening carboxyl-containing polymers can have a molecular weight of 0.5 to 6 million. Further thickening agents are polysaccharides, for example carboxymethylcellulose, methylcellulose, methylhydroxyethylcellulose, locust bean fluor ether, starch ether, alginates, polyethylene glycols, polyvinylpyrrolidones, polyvinyl alcohols or else finely divided silica, preferably with a specific surface area of of 50 to 380 m$^2$/g, and phyllosilicates, for example bentonites, bentones, smectites and montmorillonites.

Particularly useful thickening agents are acrylic polymers, like polyacrylic acid and copolymers of acrylic acid and acrylamide, where the corresponding molecular weight may vary from 0.5 to 6 million Further particularly useful thickening agents are heteropolysaccharides formed from the monosaccharides glucose and mannose and glucuronic acid, e.g. xanthan gum.

The aqueous dispersion according to the invention may contain further customary auxiliaries including, for example, further anionic or non-ionic dispersants or surfactants, sequestering agents, diffusion accelerants, antifreezes, antifoams, preservatives and bactericides.

The dispersion according to the invention is advantageously prepared by pasting up the UV absorber, the dispersant mixture and water in a mixer and, following any addition of the desired additional constituents such as sequestering agents, antifreezes, antifoams, preservatives and bactericides, dispersing for 1 to 30, preferably 1 to 10 hours. The dispersing is advantageously effected through the action of high shear forces, for example by grinding in a ball, sand or bead mill. Following grinding, an aqueous solution of the stabilizing or thickening agent and if desired further water can be added and stirred in until uniformly dispersed.

The dispersions according to the invention are notable for good transport and storage stability. They are in particular very stable at elevated temperatures up to 130° C. when used in dyebaths.

The dispersion according to the invention is used depending on the dye in the dyeing of textile material containing synthetic fibres, in particular polyester fibres. The dyeing method is carried out in a conventional manner. The dispersion according to the invention is slowly added with stirring to an aqueous bath, the dye is added and the liquor is ready for dyeing.

The present invention accordingly also provides a process for dyeing textile material which comprises dyeing this material in the presence of an aqueous dispersion containing a UV absorber and a dispersant composition as described above.

The quantities in which the assistant dispersion according to the invention is added to the dyebath vary from 0.5 to 10% by weight, preferably from 1 to 5% by weight, based on weight of fibre.

The fibre material, in particular textile material, which can be dyed in the presence of the novel light stabilizer assistant mixture comprises for example cellulose ester fibres, aromatic polyamide fibres and polyester fibres.

The dyeings are advantageously carried out from an aqueous liquor by the exhaust method. The liquor ratio can accordingly be chosen within a wide range, for example 1:3 to 1:100, preferably 1:7 to 1:50. The temperature at which the dyeing or brightening takes place is preferably at least 70° C. and in general it is not higher than 140° C. It is preferably within the range of 80 to 135° C.

Preferably, the bath which contains the dye, the assistant mixture and any further additives and has been adjusted to pH 4.5-5.5 is circulated at 60-80° C. through the fibre material for 5 minutes, the temperature is then raised to 110-135° C. in the course of 15 to 35 minutes and the dyeing liquor is left at that temperature for 15 to 90 minutes.

The dyeings are finished by cooling the dyeing liquor down to 60-80° C., rinsing the dyeing with water and, if necessary, reduction fixing it in a conventional manner in an alkaline medium. The dyeing is then rinsed again and dried. This produces on synthetic fibre material, in particular on linear polyester fibres, deep and level dyeings which, furthermore, are notable for good light fastness and rub fastness.

The differential pressure in static dyeing equipment often associated with UV absorbers and certain dyestuffs is substantially reduced by the specific dispersion according to the invention.

The present invention therefore also relates to a method for reducing the differential pressure in the static dyeing process by using disperse dyes and an aqueous dispersion containing a UV absorber and a dispersant composition as described above.

The following Examples serve to illustrate the invention; parts and percentages are by weight, unless otherwise stated.

EXAMPLE 1

An aqueous dispersion F1 is prepared by mixing the following components:

| | |
|---|---|
| 54.22 g | demineralised water |
| 12.5 g | 2-(2'Hydroxy-3'-tert.-butyl-5'-methylphenyl)-5-chlorobenzotriazole |
| 2 g | sulfonated ditolylether formaldehyde condensate (B1) |
| 0.5 g | addition product of $C_{16-18}$ alkyl alcohol and 25 mole ethylene oxide |
| 4.0 g | additional commercially available dispersant |
| 1.0 g | commercially available defoaming agent |

The mixture is milled in a sand or bead mill until the particle size is smaller than 2.5 μm. After the sand or the glass beads have been separated off,

| | |
|---|---|
| 0.4 g | xanthan gum based thickening agent |
| 0.38 g | commercially available fungicide (Proxel GXL) |
| 25.0 g | demineralised water | are added.

The resultant dispersion has a viscosity of 250 mPas and has a good storage stability.

EXAMPLE 2

An aqueous dispersion F2 is prepared by mixing the following components:

| | |
|---|---|
| 54.22 g | demineralised water |
| 12.5 g | 2-(2'Hydroxy-3'-tert.-butyl-5'-methylphenyl)-5-chlorobenzotriazole |
| 7.7 g | addition product of tris(1-phenylethyl)phenol and 16 mol of ethylene oxide |
| 2.1 g | sulfonated ditolylether formaldehyde condensate |
| 0.7 g | addition product of $C_{16-18}$ alkyl alcohol and 25 mole ethylene oxide |
| 1.0 g | commercially available defoaming agent |

The mixture is milled in a sand or bead mill until the particle size is smaller than 2.5 μm. After the sand or the glass beads have been separated off,

| | |
|---|---|
| 0.4 g | xanthan gum based thickening agent |
| 0.38 g | commercially available fungicide (Proxel GXL) |
| 25.0 g | demineralised water | are added.

The resultant dispersion has a viscosity of 250 mPas and has a good storage stability.

EXAMPLE 3

An aqueous dispersion F3 is prepared by mixing the following components:

| | |
|---|---|
| 54.22 g | demineralised water |
| 12.5 g | 2-(2'Hydroxy-3'-tert.-butyl-5'-methylphenyl)-5-chlorobenzotriazole |
| 7.7 g | addition product of tris(1-phenylethyl)phenol and 16 mol of ethylene oxide |
| 2.1 g | sulfonated alkylnaphthalene formaldehyde condensate (B2) |
| 0.7 g | addition product of $C_{16-18}$ alkyl alcohol and 25 mole ethylene oxide |
| 1.0 g | commercially available defoaming agent |

The mixture is milled in a sand or bead mill until the particle size is smaller than 2.5 μm. After the sand or the glass beads have been separated off,

| | |
|---|---|
| 0.4 g | xanthan gum based thickening agent |
| 0.38 g | commercially available fungicide (Proxel GXL) |
| 25.0 g | demineralised water | are added.

The resultant dispersion has a viscosity of 200 mPas and has a good storage stability.

EXAMPLE 4

An aqueous dispersion F4 is prepared by mixing the following components:
3 g of the dispersion prepared according to example 1 and
1.2 g of a dispersant composition containing 77% by weight of the addition product of tris(1-phenylethyl)phenol and 16 mol of ethylene oxide, 21% by weight of sulfonated ditolylether formaldehyde condensate and 2% by weight of the addition product of $C_{16-18}$ alkyl alcohol and 25 mole ethylene oxide
A stable dispersion is obtained.

EXAMPLE 5

An aqueous dispersion F5 is prepared by mixing the following components:

3 g of the dispersion prepared according to example 1 and
1.2 g of a dispersant composition containing 77% by weight of the addition product of tris(1-phenylethyl)phenol and 16 mol of ethylene oxide, 21% by weight of sulfonated alkylnaphthalene formaldehyde condensate and 2% by weight of the addition product of $C_{16-18}$ alkyl alcohol and 25 mole ethylene oxide The resultant dispersion is stable.

EXAMPLE 6

The performance of the above described dispersions F1-F5 is tested regarding reduction of the diffential pressure by treating a spindle of 40 g polyester yarn in a circulation dyeing apparatus, equipped with a differential pressure and flow rate measurement unit.

The test parameters are:
pump flow: 0.5 l/min
pump direction: inside—out
pH: 4.5-5.0; adjusted with acetic acid
temperature: 60° C.-130° C. with 2-4° C./min; 10 min at 130° C.; cool The maximum differential pressure peaks observed are listed in the following table1:

|    | % UV | % A  | % B     | % C | additional Dispersant | Δ P [bar] |
|----|------|------|---------|-----|-----------------------|-----------|
| F1 | 12.5 | —    | 2       | 0.5 | 4                     | 1.4       |
| F2 | 12.5 | 7.7  | 2.1(B1) | 0.7 | —                     | 0.32      |
| F3 | 12.5 | 7.7  | 2.1(B2) | 0.7 | —                     | 0.28      |
| F4 | 9    | 21.9 | 6.0(B1) | 0.6 | —                     | 0.11      |
| F5 | 9    | 21.9 | 6.0(B2) | 0.6 | —                     | 0.13      |

The invention claimed is:

1. A static dyeing process for dyeing textile material which comprises dyeing this material in the presence of an aqueous dispersion comprising
(A) a compound of formula (1)

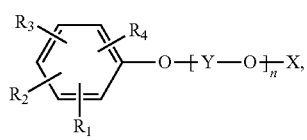

(1)

wherein $R_1$ is 1-phenylethyl, $R_2$ and $R_3$ are, independently from the other, hydrogen or 1-phenylethyl, $R_4$ is hydrogen, Y represents ethylene and n is a number from 12 to 30
and X denotes hydrogen, and
(B) a condensation product of formaldehyde with sulfonated ditolyl ether or a condensation product of formaldehyde with sulfonated di-(2-naphthyl)methane, characterized in that the weight ratio of components (A):(B) is from 19:1 to 3:1.

2. A process according to claim 1 wherein the aqueous dispersion additionally contains (C) a polyadduct of 2 to 80 mol of alkylene oxide with unsaturated or saturated monoalcohols, fatty acids, fatty amines or fatty amides of 8 to 22 carbon atoms;
characterized in that the weight ratio of components (C): ((A)+(B)) is from 1:999 to 1:9.

3. A process according to claim 2 wherein component (C) is a polyadduct of 3 to 30 mol of ethylene oxide or propylene oxide with 1 mol of a fatty alcohol of 12 to 24 carbon atoms.

4. A process according to claim 2 wherein component (C) is a polyadduct of 20 to 30 mol of ethylene oxide with 1 mol of stearyl alcohol.

5. A process according to claim 2 wherein the aqueous dispersion contains 76-84% by weight of component (A), 14-22% by weight of component (B) and 2-6% by weight of component (C), the total amount of components (A)+(B)+(C) being 100% by weight.

6. A process according to claim 1 wherein the aqueous dispersion contains a UV absorber selected from benzotriazoles, phenyltriazines and benzophenones.

7. A process according to claim 6 wherein the UV absorber is a benzotriazole compound of the formula (2)

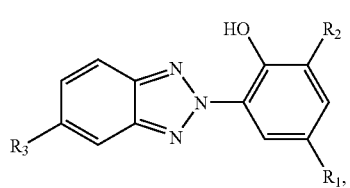

(2)

wherein $R_1$ is halogen, $C_1$-$C_{12}$ alkyl or $C_1$-$C_{12}$ alkoxy and $R_2$ and $R_3$ are each independently of the other hydrogen, halogen, $C_1$-$C_{12}$ alkyl or $C_1$-$C_{12}$ alkoxy.

8. A process according to claim 7 wherein the UV absorber is a benzotriazole compound of the formula (2a)

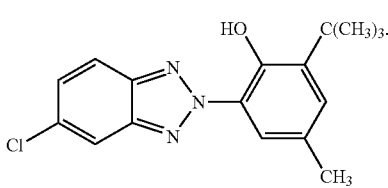

(2a)

9. A process according to claim 7 wherein the aqueous dispersion additionally contains a stabilizing or thickening agent.

10. A process according to claim 9 wherein the thickening agent is a heteropolysaccharide formed from the monosaccharides glucose and mannose and glucuronic acid.

* * * * *